(12) United States Patent
Belling et al.

(10) Patent No.: US 12,531,792 B2
(45) Date of Patent: Jan. 20, 2026

(54) SCOPE PARAMETER FOR BINDING INDICATION

(71) Applicant: NOKIA TECHNOLOGIES OY, Espoo (FI)

(72) Inventors: Horst Thomas Belling, Erding (DE); Bruno Landais, Pleumeur-Bodou (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/788,034

(22) PCT Filed: Nov. 10, 2020

(86) PCT No.: PCT/EP2020/081582
§ 371 (c)(1),
(2) Date: Jun. 22, 2022

(87) PCT Pub. No.: WO2021/136611
PCT Pub. Date: Jul. 8, 2021

(65) Prior Publication Data
US 2023/0035572 A1    Feb. 2, 2023

(30) Foreign Application Priority Data
Jan. 3, 2020  (GB) ..................................... 2000065

(51) Int. Cl.
*H04L 41/50*   (2022.01)
*H04L 67/55*   (2022.01)

(52) U.S. Cl.
CPC .......... *H04L 41/5058* (2013.01); *H04L 67/55* (2022.05)

(58) Field of Classification Search
None
See application file for complete search history.

(56) References Cited

U.S. PATENT DOCUMENTS

| | | | |
|---|---|---|---|
| 9,288,276 B2 * | 3/2016 | Adamczyk | H04L 67/54 |
| 9,509,519 B2 * | 11/2016 | Wang | H04M 15/65 |
| 9,648,173 B2 * | 5/2017 | Cheuk | H04M 15/842 |
| 10,361,874 B2 * | 7/2019 | Wang | H04L 67/14 |
| 10,805,096 B2 * | 10/2020 | Wang | H04M 15/66 |
| 11,509,728 B2 * | 11/2022 | Landais | H04L 69/322 |

(Continued)

OTHER PUBLICATIONS

Huawei et al., "Notification URI," 3GPP Draft, S2-1912308, 3GPP TSG-SA WG2 Meeting #136, Reno, NV, USA, Nov. 18-22, 2019, Nov. 22, 2019, XP051828338, pp. 1-4. (Year: 2019).*

(Continued)

*Primary Examiner* — Ranodhi Serrao
(74) *Attorney, Agent, or Firm* — SQUIRE PATTON BOGGS (US) LLP

(57) ABSTRACT

Methods, apparatuses, and computer program products for scope parameters for indication are disclosed. The method can include generating an indication comprising a scope parameter and at least one of: a network function service instance identifier, a network function service set identifier, a network function instance identifier, a network function set identifier, and a service name, wherein the scope parameter is configured to indicate at least one scenario to which an associated binding relates; and sending the indication from a network function service consumer to a network function service producer.

19 Claims, 6 Drawing Sheets

(56) References Cited

U.S. PATENT DOCUMENTS

| | | | | |
|---|---|---|---|---|
| 11,576,031 | B2* | 2/2023 | Puente Pestaña et al. ................. H04W 4/50 | |
| 11,800,408 | B2* | 10/2023 | Schliwa-Bertling ........................ H04W 28/24 | |
| 12,010,609 | B2* | 6/2024 | Fu ........................ H04W 12/04 | |
| 2008/0162637 | A1* | 7/2008 | Adamczyk ............ H04L 51/043 709/204 | |
| 2013/0231080 | A1* | 9/2013 | Cheuk ................. H04M 15/846 455/405 | |
| 2015/0071125 | A1* | 3/2015 | Wang .................... H04M 15/66 370/259 | |
| 2016/0028665 | A1* | 1/2016 | Yan ....................... H04W 12/08 370/329 | |
| 2017/0048075 | A1* | 2/2017 | Wang ...................... H04L 67/14 | |
| 2018/0227837 | A1* | 8/2018 | Starsinic ................. H04W 4/60 | |
| 2019/0238351 | A1* | 8/2019 | Wang ................. H04L 12/1407 | |
| 2020/0007632 | A1* | 1/2020 | Landais .................. H04L 67/02 | |
| 2020/0296571 | A1* | 9/2020 | Puente Pestaña ....... H04W 8/18 | |
| 2021/0195506 | A1* | 6/2021 | Bartolomé Rodrigo ..................... H04L 67/51 | |
| 2021/0258406 | A1* | 8/2021 | Ali ....................... H04W 68/005 | |
| 2021/0297935 | A1* | 9/2021 | Belling ............... H04W 88/182 | |
| 2021/0306907 | A1* | 9/2021 | Landais .............. H04L 67/1008 | |
| 2021/0314820 | A1* | 10/2021 | Schliwa-Bertling ........................ H04L 47/823 | |
| 2021/0329098 | A1* | 10/2021 | Bartolomé Rodrigo ..................... H04L 67/01 | |
| 2021/0385737 | A1* | 12/2021 | Bartolomé Rodrigo ..................... H04W 48/16 | |
| 2022/0014887 | A1* | 1/2022 | Bartolome Rodrigo ..................... H04W 4/50 | |
| 2022/0021731 | A1* | 1/2022 | Bartolomé Rodrigo ..................... H04L 67/1034 | |
| 2022/0053372 | A1* | 2/2022 | Shekhar .................. H04L 67/56 | |
| 2022/0124468 | A1* | 4/2022 | Lu ........................... H04L 67/60 | |
| 2022/0159433 | A1* | 5/2022 | Flinck .................. H04W 12/06 | |
| 2022/0232460 | A1* | 7/2022 | Fu ......................... H04W 12/10 | |

OTHER PUBLICATIONS

International Search Report and Written Opinion dated Feb. 12, 2021 corresponding to International Patent Application No. PCT/EP2020/081582.

Huawei et al., "Notification URI," 3GPP Draft, S2-1912308, 3GPP TSG-SA WG2 Meeting #136, Reno, NV, USA, Nov. 18-22, 2019, Nov. 22, 2019, XP051828338.

Nokia et al., "Binding between NF Service Consumer and NF Service Producer," 3GPP Draft, C4-193108, 3GPP TSG-CT WG4 Meeting #93, Wroclaw, Poland, Aug. 26-30, 2019, Aug. 16, 2019, XP051763959.

NTT Docomo et al., "Consumer/Producer binding for subscribe/notify," 3GPP Draft, S2-1912309, 3GPP TSG-SA2 Meeting #136, Reno, NV, USA, Nov. 18-22, 2019, Nov. 22, 2019, XP051828339.

Nokia et al., "Scope parameter for binding indication," 3GPP Draft, S2-2000223, 3GPP TSG-SA2 Meeting #136-AH, Incheon, Korea (Republic of), Jan. 13, 2020-Jan. 17, 2020, Jan. 3, 2020, XP051841488.

Nokia et al., "Scope parameter for binding indication," 3GPP Draft; S2-2000931, 3GPP TSG-SA2 Meeting #136-AH, Incheon, Korea (Republic of), Jan. 13, 2020-Jan. 17, 2020, Jan. 7, 2020, XP051842983.

Tencent, "Update of the binding procedures," 3GPP Draft; SP-191071, S2-1912656, 3GPP TSG-SA2 Meeting #136, Reno, Nevada, USA, Nov. 18-22, 2019, Dec. 3, 2019, XP051835025.

Communication pursuant to Article 94(3) EPC dated Aug. 2, 2024 corresponding to European Patent Application No. 20804514.6.

* cited by examiner

SCOPE PARAMETER FOR BINDING INDICATION

FIELD

The present application relates to a method, apparatus, system and computer program and in particular but not exclusively to binding indications in wireless networking.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

According to an aspect there is provided an apparatus comprising means for: generating an indication comprising a scope parameter and at least one of: a network function service instance identifier, a network function service set identifier, a network function instance identifier, a network function set identifier, and a service name, wherein the scope parameter is configured to indicate at least one scenario to which an associated binding relates; and sending the indication from a network function service consumer to a network function service producer.

The indication may be configured to indicate: at least one suitable target network function producer instance for network function service instance selection, reselection and routing of subsequent requests associated with a specific context; or at least one suitable network function consumer instance for notification target instance selection, reselection and routing of subsequent notification requests associated with a specific notification subscription.

The indication may be configured to allow at least one network function to indicate that the network function receiving the indication, for a particular context, should be bound to one of: a network function service instance; a network function instance; a network function service set; and a network function set.

The scope parameter may be applicable in the indication that the service consumer provides.

The scope parameter may be configured to indicate that the binding relates to at least one of: at least one subscription event; at least one notification of another event.'; and at least one further service that the network function consumer is configured to provide.

The network function service consumer may be configured as an access and mobility function and the network function service producer is configured as a session management function.

The scope parameter may be configured to comprise more than one value when the indication is configured to indicate a network function instance and network function set level of binding.

When the scope parameter indicates that the binding relates to at least one subscription event, the indication may further comprise information configured to allow the network function service producer to select a third network entity and/or service address for sending notifications to subscription events.

When the scope parameter indicates that the binding relates to at least one notification of another event, the indication may further comprise information configured to allow the network function service producer to select a third network entity and/or service address for sending notifications to other events.

When the scope parameter indicates that the binding relates to at least one further service, the indication may further comprise information configured to allow the network function service producer to select a third network entity and/or service address for sending a request for the at least one further service with same data context as a service associated with the indication.

According to an aspect, there is provided an apparatus comprising: at least one processor and at least one memory including a computer program code, the at least one memory and computer program code configured to, with the at least one processor, cause the apparatus at least to: generate an indication comprising a scope parameter and at least one of: a network function service instance identifier, a network function service set identifier, a network function instance identifier, a network function set identifier, and a service name, wherein the scope parameter is configured to indicate at least one scenario to which an associated binding relates; and send the indication from a network function service consumer to a network function service producer.

The indication may be configured to indicate: at least one suitable target network function producer instance for network function service instance selection, reselection and routing of subsequent requests associated with a specific context; or at least one suitable network function consumer instance for notification target instance selection, reselection and routing of subsequent notification requests associated with a specific notification subscription.

The indication may be configured to allow at least one network function to indicate that the network function receiving the indication, for a particular context, should be bound to one of: a network function service instance; a network function instance; a network function service set; and a network function set.

The scope parameter may be applicable in the indication that the service consumer provides.

The scope parameter may be configured to indicate that the binding relates to at least one of: at least one subscription event; at least one notification of another event.'; and at least one further service that the network function consumer is configured to provide.

The network function service consumer may be configured as an access and mobility function and the network function service producer is configured as a session management function.

The scope parameter may be configured to comprise more than one value when the indication is configured to indicate a network function instance and network function set level of binding.

When the scope parameter indicates that the binding relates to at least one subscription event, the indication may further comprise information configured to allow the network function service producer to select a third network entity and/or service address for sending notifications to subscription events.

When the scope parameter indicates that the binding relates to at least one notification of another event, the indication may further comprise information configured to allow the network function service producer to select a third network entity and/or service address for sending notifications to other events.

When the scope parameter indicates that the binding relates to at least one further service, the indication may further comprise information configured to allow the network function service producer to select a third network entity and/or service address for sending a request for the at least one further service with same data context as a service associated with the indication.

According to an aspect, there is provided a method comprising: generating an indication comprising a scope parameter and at least one of: a network function service instance identifier, a network function service set identifier, a network function instance identifier, a network function set identifier, and a service name, wherein the scope parameter is configured to indicate at least one scenario to which an associated binding relates; and sending the indication from a network function service consumer to a network function service producer.

The indication may be configured to indicate: at least one suitable target network function producer instance for network function service instance selection, reselection and routing of subsequent requests associated with a specific context; or at least one suitable network function consumer instance for notification target instance selection, reselection and routing of subsequent notification requests associated with a specific notification subscription.

The indication may be configured to allow at least one network function to indicate that the network function receiving the indication, for a particular context, should be bound to one of: a network function service instance; a network function instance; a network function service set; and a network function set.

The scope parameter may be applicable in the indication that the service consumer provides.

The scope parameter may be configured to indicate that the binding relates to at least one of: at least one subscription event; at least one notification of another event.'; and at least one further service that the network function consumer is configured to provide.

The network function service consumer may be configured as an access and mobility function and the network function service producer is configured as a session management function.

The scope parameter may be configured to comprise more than one value when the indication is configured to indicate a network function instance and network function set level of binding.

When the scope parameter indicates that the binding relates to at least one subscription event, the indication may further comprise information configured to allow the network function service producer to select a third network entity and/or service address for sending notifications to subscription events.

When the scope parameter indicates that the binding relates to at least one notification of another event, the indication may further comprise information configured to allow the network function service producer to select a third network entity and/or service address for sending notifications to other events.

When the scope parameter indicates that the binding relates to at least one further service, the indication may further comprise information configured to allow the network function service producer to select a third network entity and/or service address for sending a request for the at least one further service with same data context as a service associated with the indication.

According to an aspect, there is provided a computer readable medium comprising program instructions for causing an apparatus to perform at least the following: generate an indication comprising a scope parameter and at least one of: a network function service instance identifier, a network function service set identifier, a network function instance identifier, a network function set identifier, and a service name, wherein the scope parameter is configured to indicate at least one scenario to which an associated binding relates; and send the indication from a network function service consumer to a network function service producer.

The indication may be configured to indicate: at least one suitable target network function producer instance for network function service instance selection, reselection and routing of subsequent requests associated with a specific context; or at least one suitable network function consumer instance for notification target instance selection, reselection and routing of subsequent notification requests associated with a specific notification subscription.

The indication may be configured to allow at least one network function to indicate that the network function receiving the indication, for a particular context, should be bound to one of: a network function service instance; a network function instance; a network function service set; and a network function set.

The scope parameter may be applicable in the indication that the service consumer provides.

The scope parameter may be configured to indicate that the binding relates to at least one of: at least one subscription event; at least one notification of another event.'; and at least one further service that the network function consumer is configured to provide.

The network function service consumer may be configured as an access and mobility function and the network function service producer is configured as a session management function.

The scope parameter may be configured to comprise more than one value when the indication is configured to indicate a network function instance and network function set level of binding.

When the scope parameter indicates that the binding relates to at least one subscription event, the indication may further comprise information configured to allow the network function service producer to select a third network entity and/or service address for sending notifications to subscription events.

When the scope parameter indicates that the binding relates to at least one notification of another event, the indication may further comprise information configured to allow the network function service producer to select a third network entity and/or service address for sending notifications to other events.

When the scope parameter indicates that the binding relates to at least one further service, the indication may further comprise information configured to allow the network function service producer to select a third network entity and/or service address for sending a request for the at least one further service with same data context as a service associated with the indication.

According to an aspect, there is provided a non-transitory computer readable medium comprising program instructions for causing an apparatus to perform at least the method according to any of the preceding aspects.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
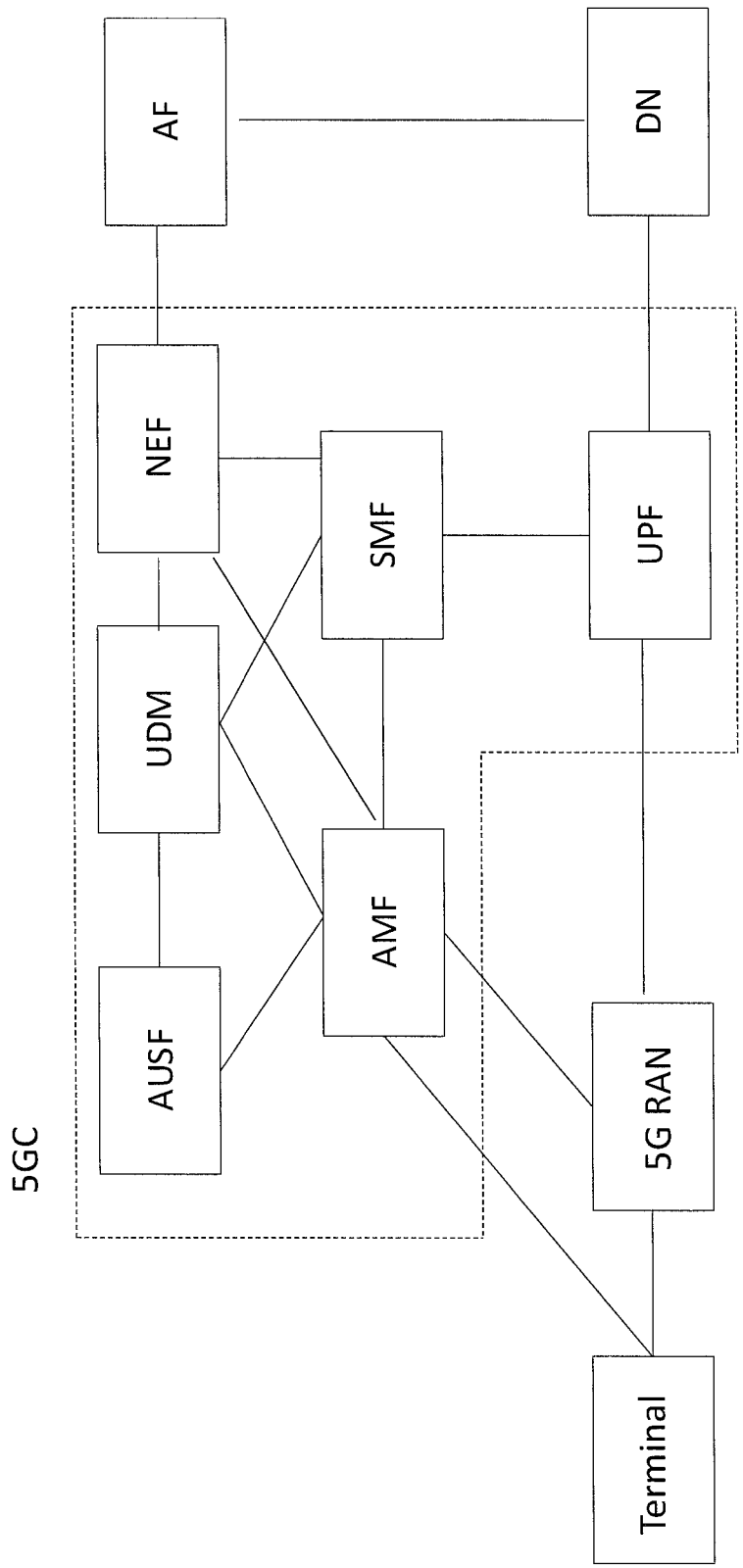
FIG. 1 shows a representation of a network system according to some example embodiments.

FIG. 1 shows a schematic representation of a 5G system (5GS). The 5GS may be comprised by a terminal or user equipment (UE), a 5G radio access network (5GRAN) or next generation radio access network (NG-RAN), a 5G core network (5GC), one or more application function (AF) and one or more data networks (DN).

The 5G-RAN may comprise one or more gNodeB (GNB) or one or more gNodeB (GNB) distributed unit functions connected to one or more gNodeB (GNB) centralized unit functions. The 5GC may comprise the following entities: Network Slice Selection Function (NSSF); Network Exposure Function; Network Repository Function (NRF); Policy Control Function (PCF); Unified Data Management (UDM); Application Function (AF); Authentication Server Function (AUSF); an Access and Mobility Management Function (AMF); and Session Management Function (SMF).

Figure 2:
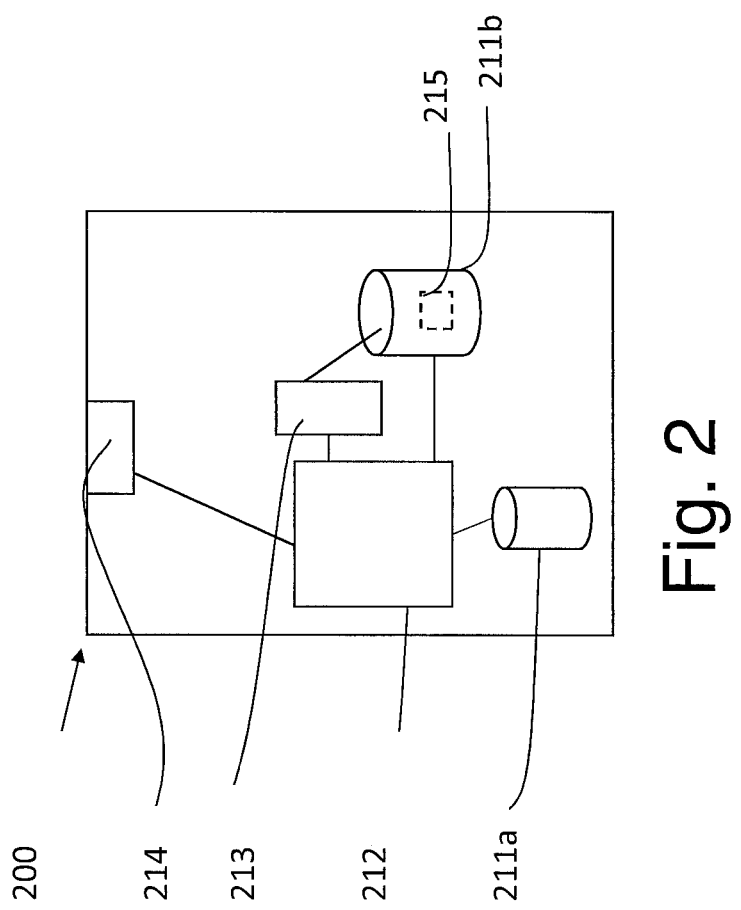
FIG. 2 shows a representation of a control apparatus according to some example embodiments.

FIG. 2 illustrates an example of a control apparatus 200 for controlling a function of the 5GRAN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5GRAN or the 5GC. In some embodiments, each function of the 5GRAN or the 5GC comprises a control apparatus 200. In alternative embodiments, two or more functions of the 5GRAN or the 5GC may share a control apparatus.

Figure 3:
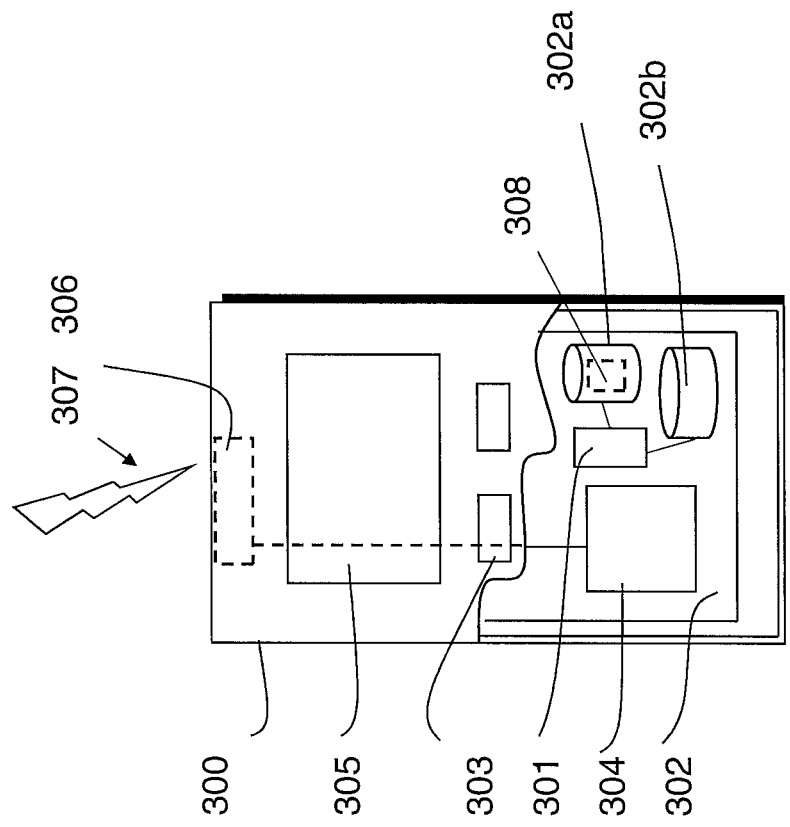
FIG. 3 shows a representation of an apparatus according to some example embodiments.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 311*a* and the ROM 311*b*. The at least one processor 301 may be configured to execute an appropriate software code 308. The software code 308 may for example allow to perform one or more of the present aspects. The software code 308 may be stored in the ROM 311*b*.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

Like the 4G Evolved Packet Core (EPC), the 5G Core aggregates data traffic from end devices. The 5G Core also authenticates subscribers and devices, applies personalized policies and manages the mobility of the devices before routing the traffic to operator services or the Internet.

While the EPC and 5G Core perform similar functions, there are some major differences in that the 5G Core is decomposed into a number of Service-Based Architecture (SBA) elements and is designed from the ground-up for complete control and user plane separation. Rather than physical network elements, the 5G Core comprises pure, virtualized, software-based network functions (or services) and can therefore be instantiated within Multi-access Edge Computing (MEC) cloud infrastructures.

Service-Based Architectures (SBA) provide a modular framework from which common applications can be deployed using components of varying sources and suppliers. The Service-Based Architecture (SBA) is defined for example by the 3GPP in 5G networks such that the control plane functionality and common data repositories of a 5G network are delivered by way of a set of interconnected Network Functions (NFs), each with authorization to access each other's services.

This new architecture provides operators with the flexibility they need to meet the diverse network requirements of all the different 5G use cases, going well beyond high speed fixed wireless or mobile broadband services.

To illustrate the 5G core network examples of the 5G network functions are:

User Plane Function (UPF). The 5G core UPF represents the evolution of the data plane function of the Packet Gateway (PGW). This separation allows data forwarding to be deployed and scaled independently so that packet processing and traffic aggregation can be distributed to the network edge.

Access and Mobility Management Function (AMF). The AMF receives all the connection and session information from end user equipment or the RAN but only handles connection and mobility management tasks. Session management information is forwarded to the Session Management Function (SMF).

Session Management Function (SMF). A fundamental component of the 5G SBA, the SMF is responsible for interacting with the decoupled data plane by creating, updating and removing Protocol Data Unit (PDU) sessions and managing session context within the UPF. Decoupling other control plane functions from the user plane, the SMF also performs the role of Dynamic Host Configuration Protocol (DHCP) server and IP Address Management (IPAM) system.

Binding can be used to indicate suitable target NF producer instance(s) for NF service instance selection, reselection and routing of subsequent requests associated with a specific context. This may allow a NF producer to indicate that a NF consumer, for a particular context, should be bound to an NF service instance, NF instance, NF service set or NF set depending on local policies and other criteria, for example at what point it is in the middle of a certain procedure, considering performance aspects etc.

Binding can also be used by a NF consumer to indicate suitable NF consumer instance(s) for notification target instance selection, reselection and routing of subsequent notification requests associated with a specific notification subscription, and for providing binding indication for other service(s) that the NF consumer produces for the same data context and the NF service producer is subsequently likely to invoke.

A Binding indication may be provided by the NF consumer and/or the NF producer. The Binding indication may have one or more levels, each level having different information indicating a different level of binding. The different levels may contain information in the following table:

| Level of Binding indication | The NF Consumer/ Notification sender/ SCP selects | The NF Consumer/ Notification sender/ SCP can reselect e.g. when selected producer is not available | Values for Binding ID(s) available for selection and reselection |
| --- | --- | --- | --- |
| NF Service Instance | The indicated NF Service Instance | An equivalent NF Service instance: within the NF Service Set (if applicable) within the NF instance within the NF Set (if applicable) | NF Service Instance ID, NF Service Set ID, NF Instance ID, NF Set ID, Service name, scope |
| NF Service Set | Any NF Service instance within the indicated NF Service Set | Any NF Service instance within an equivalent NF Service Set within the NF Set (if applicable) | NF Service Set ID, NF Instance ID, NF Set ID, Service name, scope |
| NF Instance | Any equivalent NF Service instance within the NF instance. | Any equivalent NF Service instance within a different NF instance within the | NF Instance ID, NF Set ID, Service name, scope |

-continued

| Level of Binding indication | The NF Consumer/ Notification sender/ SCP selects | The NF Consumer/ Notification sender/ SCP can reselect e.g. when selected producer is not available | Values for Binding ID(s) available for selection and reselection |
|---|---|---|---|
| NF Set | Any equivalent NF Service instance within the indicated NF Set | NF Set (if applicable) Any equivalent NF Service instance within the NF Set | NF Set ID, Service name, scope |

The scope parameter is only applicable in a binding indication that the service consumer provides. The scope parameter can indicate that the binding relates to notifications to subscription events, to notification to other events, or to other services that the NF service consumer produces. For NF Instance and NF set level of binding, several scope values can be supplied in combination. The value "notification to other events" is the default if the scope parameter is omitted.

In the case of indirect communication by the service communication proxy, SCP, to route a Request, Subscribe or Notification message, a Routing Binding Indication may be included in the message along with or in place of the Binding Indication. The Routing Binding Indication may also contain the information in the above table.

For example, a NF service producer may provide a Binding Indication to a NF service consumer as part of a direct or indirect communication procedure, to be used in subsequent related service requests.

The level of Binding Indication provided by the NF service producer to the NF consumer may indicate if the NF service producer is either bound to NF service instance, NF instance, NF Service Set or NF set as specified in the above table.

The Binding Indication may include NF Service Set ID, NF Set ID, NF instance ID, or NF service instance ID, for use by the NF consumer or SCP for NF Service Producer selection or reselection.

If the resource is created in the NF service producer, the NF service producer may provide resource information which includes the endpoint address of the NF service producer. For indirect communication, the NF service consumer may also derive the Routing Binding Indication in Request or Subscribe message from that Binding Indication.

Additionally or alternatively, during explicit or implicit notification subscription, or in response to notification requests, a NF service consumer may provide a Binding Indication to a NF service producer.

The level of Binding Indication provided by the NF service consumer to the NF service provider may indicate if the notification endpoint is either bound to NF service instance, NF instance, NF Service Set or NF set as specified in the above table.

The Binding Indication may include, NF Set ID, NF instance ID, NF Service Set ID, NF service instance ID, and service name. The NF Service Set ID, NF service instance ID, and service name may relate to the service of the NF service consumer that will handle the notification.

The NF service producer may use the Binding Indication as notification sender to select or reselect the notification endpoint, i.e. the URI where the notification is to be sent.

For indirect communication, the NF service producer may also derive a Routing Binding Indication in Notification message from that Binding Indication. For subscription to notifications via another network function, a separate subscription for subscription related events can be provided. That is to say, two binding indications for notifications may be provided. The Binding Indication for notifications to subscription related events may include a scope parameter indicating "notification for subscription events".

If the NF consumer provides binding for other services in service requests, it may indicate that the scope of the binding is for "other service" and indicated the related service name, in addition to the other parameters listed in the above table.

For NF Set or NF Instance level of binding, the binding indication for notifications and other services may be combined and the scope parameter may indicate all scenarios that the binding indication relates to.

For NF Set or NF Instance level of binding for "other services", an endpoint address registered in the NRF at NF Profile level may be used to address the other services.

In some example embodiments, a method for providing a binding indicator may comprise generating an indication comprising a scope parameter and at least one of: a network function service instance identifier, a network function service set identifier, a network function instance identifier, a network function set identifier, and a service name, wherein the scope parameter is configured to indicate at least one scenario to which an associated binding relates; and sending the indication comprising the scope parameter from a network function service consumer to a network function service producer.

The Binding Indication and/or Routing Binding Indication may comprise information indicating one or more of: a NF service instance ID, a NF service set ID, a NF instance ID, a NF set ID, a service name, and a scope parameter.

The scope parameter may indicate one or more scenarios to which an associated binding relates. For example, the scope parameter may indicate that a binding relates to one of: notifications to subscription events, to notification to other events, or to other services that the NF of the associated network entity produces.

The scope parameter may have several values if the Binding Indication indicates a NF Instance and NF set level of binding.

If the Binding Indications indicate a NF Service Instance and NF Service set level of binding, several Binding Indications with different scope values can be combined.

The second network entity or SCP may use the information to perform NF service selection or re-selection.

For scope "notifications to subscription events", the second network entity or SCP may use the binding indication with that scope to select a third network entity and/or service address where to send notifications to subscription events.

For scope "notifications to other events", the second network entity or SCP may use the binding indication with that scope to select a third network entity and/or service address where to send notifications to other events.

For scope "other services", the second network entity or SCP may use the binding indication with that scope to select a third network entity and/or service address where to send request for the same data context but another service than the service which the request message carrying the binding indication related to. The other service may be indicated with the service name parameter within the binding indication.

For NF and NF service discovery across PLMNs, the NRF in a local PLMN may interact with a NRF in a remote PLMN to retrieve NF profile(s) of NF instance(s) in the remote PLMN that matches discovery criteria. The NRF in the local PLMN may reach the NRF in the remote PLMN by forming a target PLMN specific query using the PLMN ID provided by the requester NF.

Certain non-limiting example implementations of the aforementioned concepts shall now be described with reference to FIGS. 4 to 6.

Figure 4:
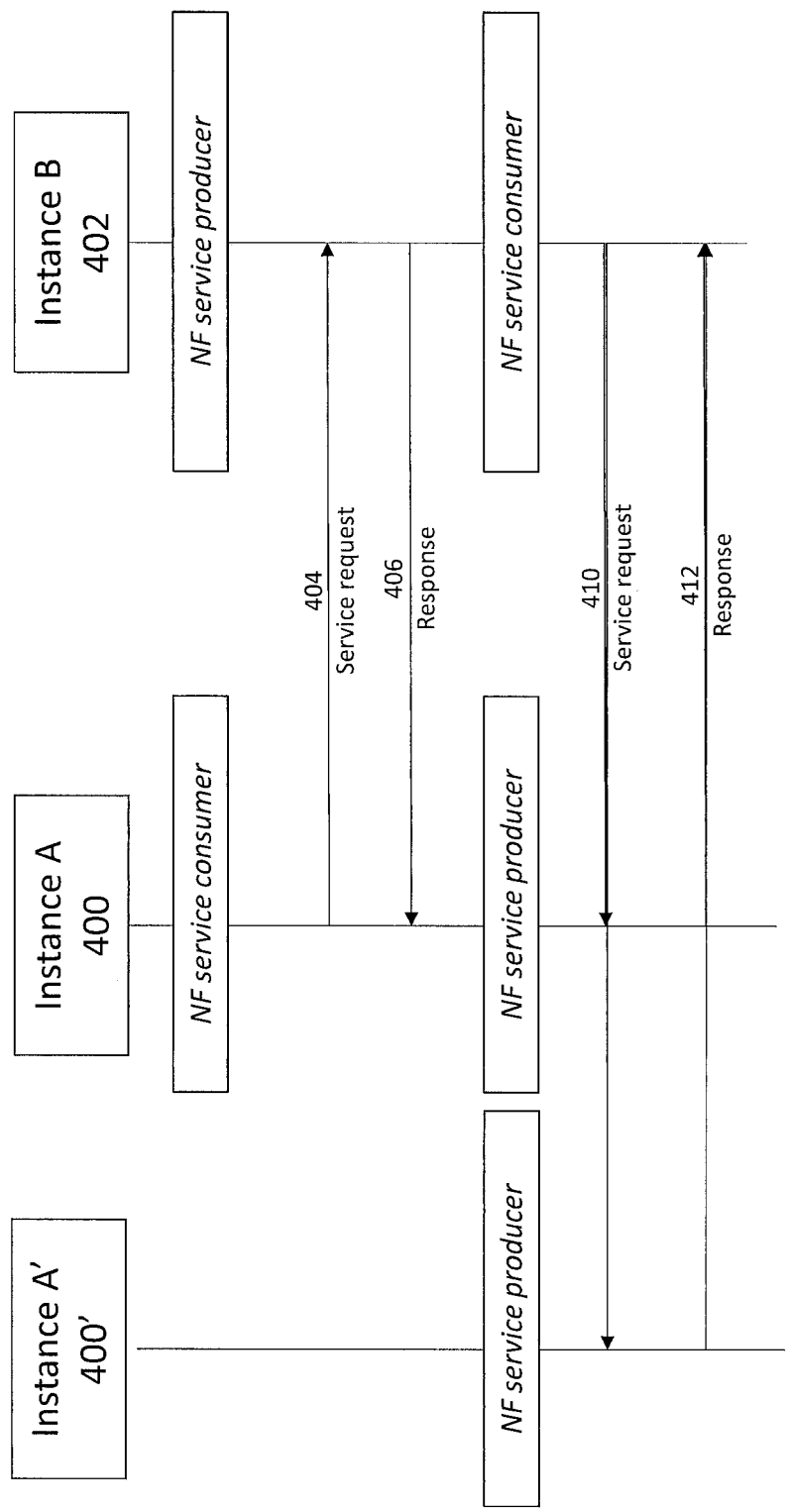
FIG. 4 shows a network flow diagram according to some examples.

FIG. 4 shows a network flow diagram showing an example binding indication as part of a service request.

An Instance A 400, acting as a NF service consumer, may be in communication with an Instance B 402, acting as a NF service producer for a first service. For example, Instance A 400 acting as a NF service consumer may be an AMF, and Instance B 402 acting as a NF service producer may be a SMF.

At 404, Instance A 400 may transmit a service request for a first service to Instance B 402.

Instance A 400 and other instances, such as Instance A' 400' of the same network function type as instance A 400 may also be capable of operating as a NF service producer for another service for later communications. The service request may comprise a Binding Indication referring to any of the information in the above table relating to Instance A 400.

For example, if the NF service instance or NF service set is included in the Binding Indication sent by Instance A 400, the scope parameter may indicate "other service", and may additionally include the service name of the "other service" and indicate NF (service) instances or sets having access for that other service to the same data context that the request for the first service relates to. A data context may for instance be be a PDU session or a UE's registration context.

At 406, Instance B may then send a response to Instance A 400.

At a later time, Instance B 402 may act as NF service consumer for another service, and Instance A 400 may act as NF service producer.

At 410, Instance B 402 may send a service request to Instance A 400 and/or to the Instance A' 400' discovered using the Binding Indication received in step 404. The Routing Binding Indication in step 410 may be derived from the second NF service consumer's Binding Indication received at step 404. If delegated discovery is used, the SCP may route the service request using the Routing Binding Indication and resource information sent from the NF service consumer. If delegated discovery is not used, Instance B may need to discover the corresponding endpoint address of Instance A.

At 412, Instance A 400, acting as NF service producer, may send a response to Instance B 402, acting as NF service consumer. Instance A 400 acting as NF service producer may respond with an updated resource information and/or Binding Indication, different to the one received in the previous response.

Figure 5:
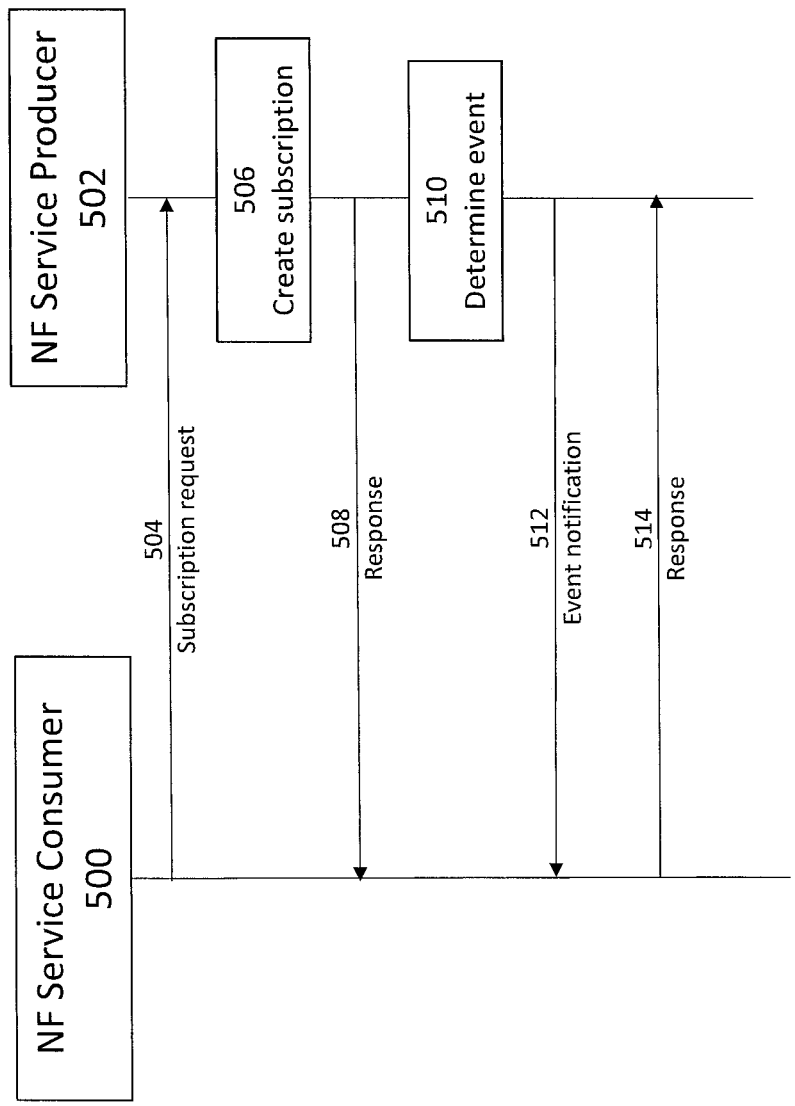
FIG. 5 shows a network flow diagram according to some examples.
Figure 6:
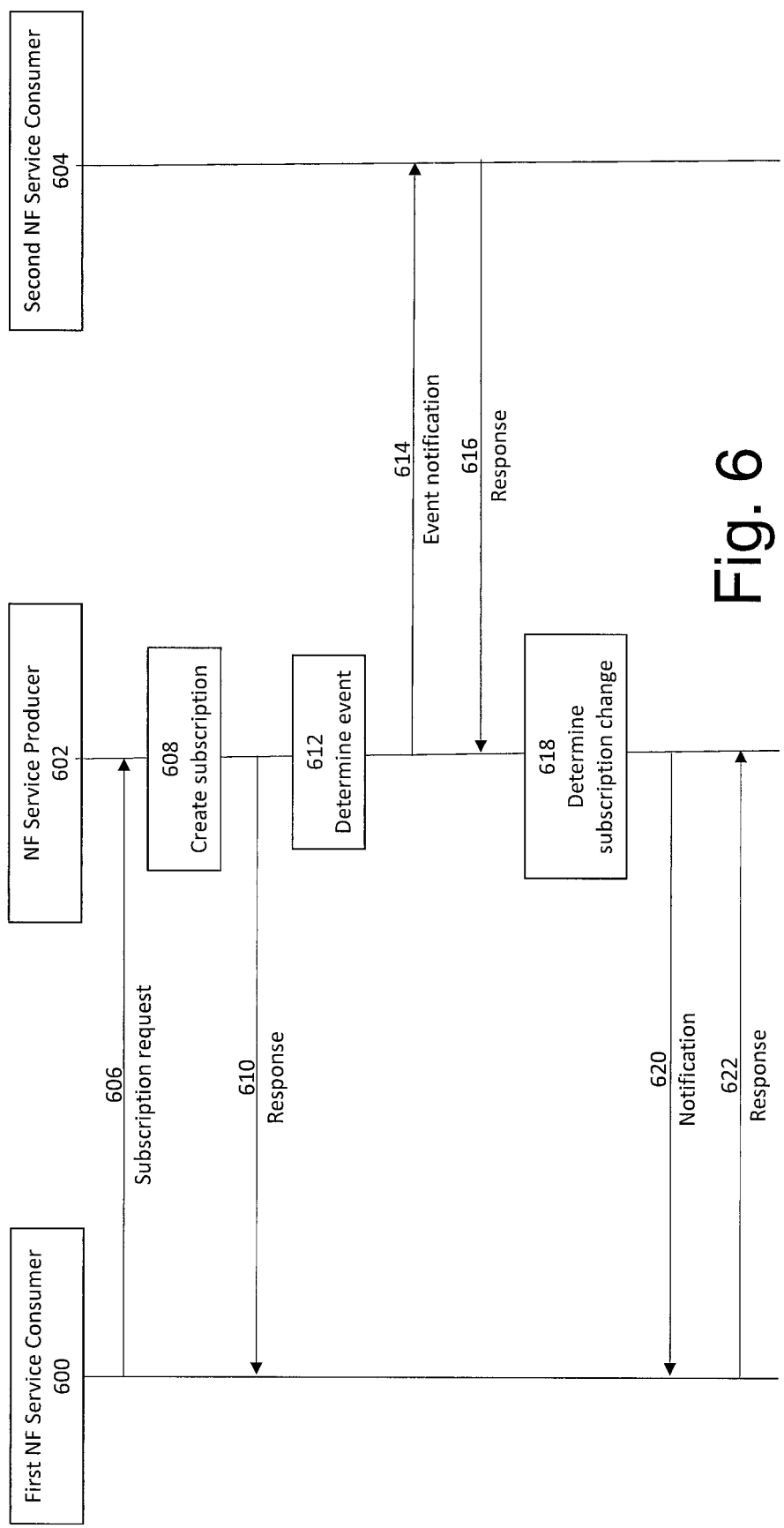
FIG. 6 shows a network flow diagram according to some examples.

FIGS. 5 and 6 show network flow diagrams showing examples of the Binding Indication as part of a subscription request.

In FIG. 5, NF service consumer 500 is in communication with NF service producer 502.

At 504, the NF service consumer 500 may transmit a subscription request to NF service producer 502. The subscription request may comprise a first Binding Indication as described previously, relating to the NF service consumer 500, and optionally a notification target address and notification correlation ID. The scope parameter may indicate "notifications to other events" and possibly "notifications to subscription events", or may be omitted to indicate that the binding indication relates to "notifications to other events".

At 506, the NF service producer 502 may create a subscription based on the message received at step 504.

At 508, the NF service producer 502 may transmit a response message to the NF service consumer 500. The response message may comprise a second Binding Indication as described previously, relating to the NF service producer 502. The response message sent at step 508 may be based on the first Binding Indication sent by the NF service consumer 500 at step 504.

At 510, the NF service producer 502 may determine an event, and notify the NF service consumer 500 at step 512. Optionally, the notification sent at 512 may also comprise a first Routing Binding Indication derived from the first Binding Indication, the notification target address, and the notification correlation ID received at step 504.

At 514, the NF service consumer 500 may transmit a response message to the NF service producer 502. The response message may comprise an updated version of first Binding Indication.

If the NF service consumer 500 needs to update the first Binding Indication, the NF service consumer 500 may initiate a new subscription request to the NF service producer 502 with an updated first Binding Indication. Alternatively, the NF service consumer 500 may include the updated first Binding Indication in the response message 514 sent to the NF service producer 502 after receiving a notification.

In response to receiving the updated first Binding Indication, the NF service producer 502 may update the subscription accordingly.

In some examples, the communication between the NF service consumer 500 and NF service producer 502 may be sent via a service communication proxy (SCP). Such communication is herein referred to as "indirect communication".

For indirect communication, any communication sent from the NF service consumer 500 is sent to the SCP, which then sends the communication on to the NF service producer 502. Similarly, any communication sent from the NF service consumer 502 is sent to the SCP, which then sends the communication on to the NF service consumer 500.

For indirect communications, the NF service producer 502 may include a Routing Binding Indication with the same content as the first Binding Indication sent by the NF service consumer 500 at step 504 when sending communications to the SCP. The SCP may then select a target for the communication based on the Routing Binding Indication.

FIG. 6 shows an example of a first NF service consumer 600 performing a subscription to NF service producer 602 on behalf of a second NF service consumer 604.

At step 606, the first NF service consumer 600 sends a subscription request to NF service producer 602. The subscription request may comprise the first NF service consumer's notification target address, the first NF service consumer's notification correlation ID, the first NF service consumer's Binding Indication, the second NF service consumer's notification target address, the second NF service consumer's notification correlation ID, and the second NF service consumer's Binding Indication. The first NF service consumer's Binding Indications may have a scope parameter indicating "subscription events".

At step 608, the NF service producer 602 may create a subscription based on the received subscription request.

At step 610, the NF service producer 602 may send a subscription response to the first NF service consumer 600. The subscription response may comprise the NF service producer's Binding Indication.

At step 612, the NF service producer 602 may determine an event, and notify the second NF service consumer 604 at step 614. The notification may be based on the second NF service consumer's notification target address, correlation ID, and Binding Indication received at step 606. The Routing Binding Indication in step 612 may be derived from the second NF service consumer's Binding Indication received at step 606.

At step 616, the second NF service consumer 604 may send a response to the NF service producer 602.

At step 618, if the NF service producer 602 determines a change in subscription, then at step 620 the NF service producer 602 may transmit a notification request to the first NF service consumer 600. The notification request may be based on the first NF service consumer's notification target address, the first NF service consumer's notification correlation ID, and the first NF service consumer's Binding Indication received at step 606. The Routing Binding Indication in step 618 may be derived from the first NF service consumer's Binding Indication received at step 606.

At step 622, the first NF service consumer may send a notification response to the NF service producer.

In some example embodiments, an apparatus may comprise means for: generating an indication comprising a scope parameter and at least one of: a network function service instance identifier, a network function service set identifier, a network function instance identifier, a network function set identifier, and a service name, wherein the scope parameter is configured to indicate at least one scenario to which an associated binding relates; and sending the indication comprising the scope parameter from a network function service consumer to a network function service producer.

In some example embodiments, an apparatus may comprise at least one processor and at least one memory including a computer program code, the at least one memory and computer program code configured to, with the at least one processor, cause the apparatus at least to: generate an indication comprising a scope parameter and at least one of: a network function service instance identifier, a network function service set identifier, a network function instance identifier, a network function set identifier, and a service name, wherein the scope parameter is configured to indicate at least one scenario to which an associated binding relates; and send the indication comprising the scope parameter from a network function service consumer to a network function service producer.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:
   (a) hardware-only circuit implementations (such as implementations in only analog and/or digital circuitry) and
   (b) combinations of hardware circuits and software, such as (as applicable):
   (i) a combination of analog and/or digital hardware circuit(s) with software/firmware and
   (ii) any portions of hardware processor(s) with software (including digital signal processor(s)), software, and memory(ies) that work together to cause an apparatus, such as a mobile phone or server, to perform various functions) and
   (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims.

Indeed, there is a further embodiment comprising a combination of one or more embodiments with any of the other embodiments previously discussed.

The invention claimed is:

1. A method, comprising:
generating a binding indication configured to bind a recipient, for a particular context, in at least one of network function service provider selection or network function service provider reselection, the binding indication comprising a scope parameter, a service name, and at least one level of binding indication of a plurality of levels of binding indications, the plurality of levels of binding indications comprising: a network function service instance identifier, a network function service set identifier, a network function instance identifier, and a network function set identifier, wherein the scope parameter is configured to indicate the binding indication relates to notification of at least one subscription event, notification of at least one another event, and at least one further service that a network function service consumer is configured to produce; and
sending the binding indication from the network function service consumer to a network function service producer.

2. The method as claimed in claim 1, wherein the binding indication is configured to indicate:
at least one suitable target network function producer instance for network function service instance selection, reselection and routing of subsequent requests associated with a specific context; or
at least one suitable network function consumer instance for notification target instance selection, reselection and routing of subsequent notification requests associated with a specific notification subscription.

3. The method as claimed in claim 2, wherein the binding indication is configured to allow at least one network function to indicate that the network function receiving the binding indication, for a particular context, should be bound to one of:
a network function service instance;
a network function instance;
a network function service set; and
a network function set.

4. The method as claimed in claim 3, wherein the scope parameter is applicable in the binding indication that the service consumer provides.

5. The method as claimed in claim 1, wherein the network function service consumer is configured as an access and mobility function and the network function service producer is configured as a session management function.

6. The method as claimed in claim 1, wherein the scope parameter is configured to comprise more than one value when the binding indication is configured to indicate a network function instance and network function set level of binding.

7. The method as claimed in claim 1, wherein when the scope parameter indicates that the binding indication relates to notification of at least one subscription event, the binding indication further comprises information configured to allow the network function service producer to select a third network entity and/or service address for sending notifications to subscription events.

8. The method as claimed in claim 1, wherein when the scope parameter indicates that the binding indication relates to notification of at least one another event, the binding indication further comprises information configured to allow the network function service producer to select a third network entity and/or service address for sending notifications to other events.

9. The method as claimed in claim 1, wherein when the scope parameter indicates that the binding indication relates to at least one further service, the binding indication further comprises information configured to allow the network function service producer to select a third network entity and/or service address for sending a request for the at least one further service with same data context as a service associated with the binding indication.

10. An apparatus, comprising:
at least one processor; and
at least one memory including computer program code, the at least one memory and computer program code being configured, with the at least one processor, to cause the apparatus to perform:
generating a binding indication configured to bind a recipient, for a particular context, in at least one of network function service provider selection or network function service provider reselection, the binding indication comprising a scope parameter, a service name, and at least one level of binding indication of a plurality of levels of binding indications, the plurality of levels of binding indications comprising: a network function service instance identifier, a network function service set identifier, a network function instance identifier, and a network function set identifier, wherein the scope parameter is configured to indicate the binding indication relates to notification of at least one subscription event, notification of at least one another event, and at least one further service that a network function service consumer is configured to produce; and sending the binding indication from the network function service consumer to a network function service producer.

11. The apparatus as claimed in claim 10, wherein the binding indication is configured to indicate:
at least one suitable target network function producer instance for network function service instance selection, reselection and routing of subsequent requests associated with a specific context; or
at least one suitable network function consumer instance for notification target instance selection, reselection and routing of subsequent notification requests associated with a specific notification subscription.

12. The apparatus as claimed in claim 11, wherein the binding indication is configured to allow at least one network function to indicate that the network function receiving the binding indication, for a particular context, should be bound to one of:
a network function service instance;
a network function instance;
a network function service set; and
a network function set.

13. The apparatus as claimed in claim 12, wherein the scope parameter is applicable in the binding indication that the service consumer provides.

14. The apparatus as claimed in claim 10, wherein the network function service consumer is configured as an access and mobility function and the network function service producer is configured as a session management function.

15. The apparatus as claimed in claim 10, wherein the scope parameter is configured to comprise more than one value when the binding indication is configured to indicate a network function instance and network function set level of binding.

16. The apparatus as claimed in claim 10, wherein when the scope parameter indicates that the binding indication relates to notification of at least one subscription event, the binding indication further comprises information configured to allow the network function service producer to select a third network entity and/or service address for sending notifications to subscription events.

17. The apparatus as claimed in claim 10, wherein when the scope parameter indicates that the binding indication relates to notification of at least one another event, the binding indication further comprises information configured to allow the network function service producer to select a third network entity and/or service address for sending notifications to other events.

18. The apparatus as claimed in claim 10, wherein when the scope parameter indicates that the binding indication relates to at least one further service, the binding indication further comprises information configured to allow the network function service producer to select a third network entity and/or service address for sending a request for the at least one further service with same data context as a service associated with the binding indication.

19. A computer program embodied on a non-transitory computer-readable medium, said computer program comprising program instructions which, when executed on an apparatus, cause the apparatus to:
generate a binding indication configured to bind a recipient, for a particular context, in at least one of network function service provider selection or network function service provider reselection, the binding indication comprising a scope parameter, a service name, and at least one level of binding indication of a plurality of levels of binding indications, the plurality of levels of binding indications comprising: a network function service instance identifier, a network function service set identifier, a network function instance identifier, and a network function set identifier, wherein the scope parameter is configured to indicate the binding indication relates to notification of at least one subscription event, notification of at least one another event, and at least one further service that a network function service consumer is configured to produce; and
send the binding indication from the network function service consumer to a network function service producer.

* * * * *